United States Patent Office 3,456,053

Patented July 15, 1969

1

2

3,456,053
INACTIVATED HOG CHOLERA VIRUS VACCINE

James G. Crawford, Terre Haute, Ind., assignor to Chas. Pfizer & Co., Inc., New York, N.Y., a corporation of Delaware No Drawing. Filed May 6, 1966, Ser. No. 548,060
Int. Cl. A61k *23/00;* C12k *5/00*
U.S. Cl. 424—89 5 Claims This invention relates to the preparation of an antihog cholera product. More particularly, it relates to a process for preparing an inactivated hog cholera vaccine and its use for immunization of swine against hog cholera.

Hog cholera, also known as swine fever, is an acute, highly contagious disease of swine caused by a filtrable virus. It usually runs an acute course with 90 to 100% mortality and may become chronic. The use of hog cholera antiserum was the first method used for protecting swine against this disease. This was followed by another method which consisted of a simultaneous serum and virulent virus vaccination. Since the first method provided only short term protection and the second failed to immunize animals in poor health properly, the method of utilizing killed or inactivated vaccines was developed. Examples of the latter type include the crystal violet vaccine in which the virus is killed by the use of crystal violet and heat and the Boynton vaccine wherein the virus is killed by eucalyptol and heat.

The present invention relates to a process for preparing an improved inactivated hog cholera vaccine incorporating two novel process innovations therein. The first pertains to the cultivation or growth step and the second to the inactivation step. With regard to the former, the general procedure for obtaining "hog-cholera infected blood" or, more appropriately, virulent hog cholera virus consists of harvesting tissues from swine which have been inoculated with hog cholera live virus. Said tissuees were generally restricted to blood and spleen. Furthermore, the cultivation step was done entirely in vivo.

The first innovation of the herein disclosed invention makes possible a cultivation step leading to a high titered virus which is free from contaminating microorganisms, is potency measurable and potency adjustable. The reason it allows a more predictable product to be obtained resides in the fact that the growth or cultivation step is carried out in vitro in cultures of various swine tissuees. Particularly effective is swine testicle tissue. With this virus growth procedure, it is possible to propagate and titrate virus under defined conditions, thereby insuring adequate, specific, antigenic mass required to prepare a pure and potent antihog cholera vaccine. This is in contrast to production of virus in vivo where the quantity and quality of the virus obtained for vaccine purposes is not readily controlled.

The second innovation, secondary in nature, relates to the inactivation step. Although of equivalent importance in comparison to the novel cultivation step described above, it is secondary in that its value derives from the primary cultivation step. In other words, the inactivation step is, although independent, an outgrowth of the cultivation step. In connection with the inactivation process, it is found that several inactivating agents are effective and include toluidine blue with irradiation, hydroxylamine and ethylene oxide. Most particularly preferred for inactivating virus is toluidine blue which has been found to be remarkably effective. Although some viruses are known to be photosensitive, this was a new finding concerning hog cholera virus when toluidine blue was utilized. Such a finding is in direct contrast to the effect of crystal violet on this virus. In our studies crystal violet has been shown to be totally ineffective in inactivating this virus. Thus, inactivated vaccine prepared by the crystal violet method was actually inactivated by the heat-storage procedure rather than by a specific inactivating chemical. Unlike crystal violet, toluidine blue rapidly inactivates hog cholera virus without heat. Further, the use of toluidine blue is novel in that the dye combines specifically with the infectious component of the virus (the nucleic acid) rendering it non-infectious. This is accomplished without alteration of the antigenic protein coat of the virus. This theoretically allows the inactivated virus antigen to stimulate antibodies that are identical with antibodies stimulated by the natural virus, thus conferring a more perfect protection.

When toluidine blue is used, the inactivation process is completed by an irradiation step. The irradiation step will generally consist of passing the virus fluid through a 30 in. x ½ in. diameter glass tube at a rate of one liter per minute while simultaneously irradiating by four 400-watt flood lamps evenly positioned along the tube at a height of 14 in. Of course, any suitable irradiation scheme will work and the method above is only to indicate a satisfactory experimental procedure.

It is possible, although less preferred to use other inactivating agents, for example, hydroxylamine or ethylene oxide. When hydroxylamine is used, the hog cholera virus is combined with a sufficient amount of hydroxylamine to provide a final concentration of 0.5 M with regard to said virus. As for ethylene oxide, a final concentration of virus of 1% is preferred.

Until recently, the most desirable means of vaccinating pigs for anti-cholera protection was by administering an attenuated live virus. There exists now, however, strong feeling that an inactivated or killed vaccine is preferable in light of recent finding that attenuated live vaccines may revert back in time to their virulent forms. With the apparent need, therefore, for an effective inactivated vaccine, the present invention discloses a product which is as effective as any prior inactivated vaccine.

Accordingly, the present invention discloses a process for preparing an inactivated hog cholera vaccine which comprises growing a vaccine virus by infecting a swine tissue culture monolayer with virulent hog cholera virus at a pH of about 7.2 to about 7.6 until substantial virus replication has occurred, cooling said resulting vaccine virus to the frozen state followed by warming said vaccine virus and recovering the virulent virus; inactivating said virulent virus; and harvesting the inactivated vaccine product.

The preferred embodiment of the above process consists of the following conditions:

(a) The use of swine testicle tissue.

(b) An inactivation step which consists of combining the virulent virus with aqueous toluidine blue wherein said toluidine blue is added in an amount to provide a final concentration of 2 mcgs. of toluidine blue per ml. of virus and subsequent irradiation.

(c) A harvesting step which consists of precipitating the vaccine from a mixture comprising inactivated virus and hydrated aluminum oxide and subsequently reconstituting the precipitate in phosphate buffered saline.

The inactivated vaccine product obtained by the process of the present invention is administered to pigs or swine parenterally, that is either intramuscularly or subcutaneously. The dosage levels can vary from about 1 to 8 ml. of vaccine product; however, it is preferred to administer a dose containing about 3 ml. of vaccine. It may be desirable to administer a second dose to confer long term immunity. When the vaccine as prepared by the herein disclosed procedure is administered subcutaneously to pigs, immunity is conferred to said pigs so that they are able to resist challenge to virulent hog cholera virus.

The following examples are given by way of illustration and should not be interpreted as limiting the in-

EXAMPLE I

A. *Cultivation step.*—Testicles from swine ranging from 4 to 16 weeks of age or older are removed from healthy pigs and aseptically minced and treated with trypsin to reduce the tissue mass to a cell suspension. The cells are then resuspended to a concentration of 300,000 to 800,000 cells per ml. in a nutrient medium containing 10% bovine serum or other suitable serum. After a growth period of 48 hours of 370 C., the growth media is decanted and the cells are infected with virulent hog cholera virus. The cultures are then incubated at 37° C. for four or five days (pH of 7.2 is constant throughout). After this period, the tissue cultures are frozen at −20° C. On the following day, after thawing, the virus fluids are recovered by collecting through a nylon filter to remove tissue debris.

B. *Inactivation step.*—The virulent virus above is combined with aqueous toluidine blue in the proportion of 1 ml. of toluidine blue to 99 ml. of virus which results in a final concentration of 2 mcgs. of toluidine blue per ml. of virus. The inactivation step is completed by passing the virus fluid through a 330 in. x ½ in. diameter glass tube at the rate of one liter per minute while simultaneously irradiating with 4 400-watt flood lamps evenly proportioned along the tube at a height of 14 in.

C. *Harvesting.*—The inactivated virus obtained above is absorbed onto hydrated aluminum oxide by combining the inactivated virus fluid with said aluminum oxide adjuvent in proportion to give a final concentration of 12 mg. of hydrated aluminum oxide per ml. of liquid virus. The precipitate is then collected and reconstituted in phosphate buffered saline to ½ of the original virus volume.

EXAMPLE II

The procedure of Example I is repeated wherein the following swine tissue cultures are used in lieu of swine testicle tissue culture with comparable results:
Swine kidney tissue
Swine ovary tissue

EXAMPLE III

A group of 14 pigs each weighing from 60 to 100 lbs. are vaccinated subcutaneously with a 3 ml. dose of inactivated hog cholera vaccine as prepared by the procedure of Example I. After 21 days (postvaccination) the animals are challenged via parental administration with 2 ml. of virulent hog cholera virus. The animals are then observed over a 14-day period past challenge for any symptoms of hog cholera. None of the 14 animals tested indicated any symptoms of hog cholera and all survived. On the other hand, 14 control animals which received the virulent challenge virus only, all died with symptoms of hog cholera within the 14-day period.

What is claimed is:

1. A process for preparing an inactivated hog cholera vaccine which comprises growing a vaccine virus by infecting a swine tissue culture monolayer with virulent hog cholera virus at a pH of about 7.2 to about 7.6 until substantial virus replication has occurred, cooling said resulting vaccine virus to the frozen state followed by warming said vaccine virus until it thaws out, and recovering the virulent virus after thawing, by separating the tissue debris from the virus fluids; inactivating said virulent virus by the step of (1) contacting the recovered virulent virus with aqueous toluidine blue, hydroxylamine, or ethylene oxide, and (2) where aqueous toluidine blue is employed, irradiating the resulting material with flood lamps; and harvesting the inactivated vaccine product.

2. The process of claim 1 wherein said swine tissue culture is a swine testicle tissue culture.

3. The process of claim 1 wherein the inactivation step consists of commingling said virulent virus with aqueous toluidine blue, said toluidine blue added in an amount to provide a final concentration of 2 mcgs. of toluidine blue per ml. of virus, and irradiating the resulting mixture.

4. The process of claim 1 wherein said harvesting of inactivated vaccine product consists of precipitating the vaccine from a mixture comprising inactivated virus and hydrated aluminum oxide and subsequently reconstituting the precipitate in phosphate buffered saline.

5. A process for rendering hog cholera susceptible pigs resistant to hog cholera virus which comprises parenterally injecting into said pigs a vaccine as prepared by the process of claim 1.

References Cited

UNITED STATES PATENTS

| | | | |
|---|---|---|---|
| 1,210,053 | 12/1916 | Duval | 167—80 |
| 2,225,627 | 12/1940 | Flosdorf | 343—24 |
| 2,705,696 | 4/1955 | Wolfe et al. | 167—78 |
| 3,127,317 | 3/1964 | Kern | 167—74 |
| 3,269,912 | 8/1966 | Grafe | 167—78 |

OTHER REFERENCES

Tenbroeck, J. Exp. Med. 74 (5): 427–432 (1941).
Boynton, Vet. Med. 14: 346–347 (1946).
Mathews et al.: Cornell Vet. 43: 452–461 (1953).
Soekewa et al.: Jap. Jour. Vet. Sci. 16 (5): 227–248 (1954).
Ichihawa 19 (3): 85–94 (1957).
Collins, Amer. J. Vet. Res. 19 (72): 540–544 (1958).
Franklin et al.: Nature 184: 343–5 (1959).
Hiatt et al.: J. Immunol 84: 480–484 (1960).

LEWIS GOTTS, Primary Examiner

S. K. ROSE, Assistant Examiner

U.S. Cl. X.R.

195—1.2, 1.4, 1.5; 424—90